(12) United States Patent
Kalinoski et al.

(10) Patent No.: US 12,478,703 B2
(45) Date of Patent: Nov. 25, 2025

(54) AROMATHERAPY CASE WITH ROTATABLE HINGE

(71) Applicant: LIFELINES, LLC, Westport, CT (US)

(72) Inventors: Jeff Kalinoski, Brooklyn, NY (US); Melissa Bernstein, Westport, CT (US); Mauricio Issa, Rego Park, NY (US)

(73) Assignee: Lifelines, LLC, Westport, CT (US)

( * ) Notice: Subject to any disclaimer, the term of this patent is extended or adjusted under 35 U.S.C. 154(b) by 495 days.

(21) Appl. No.: 17/990,251

(22) Filed: Nov. 18, 2022

(65) Prior Publication Data

US 2024/0165288 A1 May 23, 2024

(51) Int. Cl.
*A61L 9/12* (2006.01)
*A61L 9/14* (2006.01)
*A61M 11/04* (2006.01)

(52) U.S. Cl.
CPC ...... *A61L 9/12* (2013.01); *A61L 9/14* (2013.01); *A61M 11/04* (2013.01)

(58) Field of Classification Search
CPC ....................................................... A61L 9/12
See application file for complete search history.

(56) References Cited

U.S. PATENT DOCUMENTS

| 8,265,465 | B2 | 9/2012 | Jorgensen |
| 9,028,759 | B2 | 5/2015 | Wirz |
| 10,098,979 | B1 | 10/2018 | Wang |
| 10,561,757 | B2 | 2/2020 | Rasmussen et al. |
| 2006/0196100 | A1 | 9/2006 | Laudamiel-Pellet |
| 2007/0001023 | A1 | 1/2007 | Green |
| 2009/0008411 | A1* | 1/2009 | Schumacher ....... A01M 1/2033 222/175 |
| 2011/0038761 | A1* | 2/2011 | Saleh ...................... A61L 9/122 422/124 |
| 2021/0018247 | A1* | 1/2021 | Hanson ................ F25D 17/042 |

FOREIGN PATENT DOCUMENTS

| CN | 201505311 | | 6/2010 | |
| CN | 210250682 | | 4/2020 | |
| GB | 2418143 A | * | 3/2006 | ............ A61M 21/00 |
| WO | 2020191580 | | 10/2020 | |

* cited by examiner

*Primary Examiner* — Kevin Joyner
(74) *Attorney, Agent, or Firm* — Wissing Miller LLP

(57) ABSTRACT

An aromatherapy device is formed by a top and bottom shell. Each shell is connected with a respective tray. The trays include interengaging male and female structures that allow the top and bottom shells to rotate about a rotation axis to open and close the device. On the tray connected with the bottom shell a scent emitter is held. The scent emitter is a porous object, such as a pumice stone, that holds an aromatic substance, such as an essential oil. The male structure on one tray includes a cylindrical protrusion that engages a groove on the female structure of the other tray. One or more relieved regions are provided about the circumference of the protrusion and. one or more raised surfaces are provided at selected angular positions along the wall. Engagement of the raised surfaces with the relieved regions holds the top shell at selected orientations with respect to the bottom shell, for example, to hold the device in an open or closed configuration.

17 Claims, 13 Drawing Sheets

AROMATHERAPY CASE WITH ROTATABLE HINGE

BACKGROUND OF THE INVENTION

Field of the Invention

The present disclosure relates to a portable case containing a scent emitter. More particularly, the present disclosure relates to an apparatus that is convenient to hold and to carry and is openable to reveal a scent emitter such as a scent stone.

Description of the Related Art

Aromatherapy is a technique for improving emotional and/or physical health of a person by providing aromatic scents. Such scents may be provided by evaporating volatile liquids such as essential oils. Aromatherapy may be provided by providing a portable container holding an essential oil for the person to carry with them. The oil evaporates from the container to provide a continuous source of healing vapors. Should the oil leak from the container, it may stain or otherwise damage surfaces such as upholstery and clothing. Thus, there is a need for a container that can hold a volatile liquid that is easy to carry and that securely contains the liquid as it evaporates.

People enjoy fidgeting or manipulating devices they can carry in their pockets or purses. Objects such as worry beads are well-known. These objects provide pleasing tactile sensations as they are manipulated. Such objects may also provide sounds that people may find relaxing. The relaxing effect of such fidgeting devices may be enhanced if combined with pleasing aromatherapy scents. Thus, there is a need to provide a device for securely containing aromatic substances that also provided pleasing tactile and audible stimulation.

Scent holders and boxes are well known. However, they can be bulky and unwieldy, and inappropriate for routinely carrying in a pocket. Also, handling them and fidgeting with them or touching them may not provide a pleasing feel to the hand. In addition, opening and closing them is not necessarily intuitive and may entail the user having to open latches or Fig. out other closure mechanisms. Thus, a need exists for a conveniently portable, easy to use scent box that is intuitive to open, to close, and to use. A need also exists for such a scent box combined with tactile elements that make the box pleasing to hold and to manipulate.

BRIEF SUMMARY OF THE INVENTION

Embodiments of the disclosure provide a scent case that includes a scent emitter and a hinge mechanism to open and close the scent case. According to an illustrated embodiment, an aromatherapy device is described that is formed from a bottom shell, a top shell, a first tray comprising a curved protrusion arranged about a rotation axis, wherein the first tray is connected with a one of the bottom shell and the top shell. The device further comprises a second tray comprising a scent emitter cavity and a curved receiving groove arranged about the rotation axis and positioned and configured to receive the curved protrusion and to guide rotation of the curved protrusion about the rotation axis. The second tray is connected with another of the bottom and top shells. The device further comprises a scent emitter positioned in the scent emitter cavity and configured to release a scent. The device may also include a fastener arranged along the rotation axis, wherein the fastener holds the top and bottom trays in vertical alignment along the rotational axis. A spring may be connected with the fastener and arranged to urge the top and bottom trays toward one another along the rotation axis. The spring may be a conical spring.

One of the first tray and the second tray may further comprise a wall concentric with the rotation axis, wherein the wall comprises at least one lowered horizontal surface and at least two raised horizontal surface and another of the top and bottom trays may comprise at least one bearing surface arranged to contact the lowered and raised surfaces of the wall. Rotation of the top and bottom trays about the rotation axis causes the bearing surface to slide along the wall. The fastener allows the top and bottom trays to separate along the rotation axis as the bearing surface slides along the wall. When the bearing surface is aligned with the lowered horizontal surface, the spring holds bearing surface and lowered horizontal surface in contact, securing the top and bottom trays at a selected position about the rotation axis. The one or more lowered horizontal surfaces may comprise at least two lowered horizontal surfaces, wherein one of the lowered horizontal surfaces is arranged to engage with the bearing surface when the top shell is closed over the bottom shell and wherein another of the two lowered horizontal surfaces is arranged to engage with the bearing surface when the top shell is at a selected open angle with respect to the bottom shell. The wall may comprise a plurality of ramped surfaces between adjacent lowered horizontal surfaces and raised horizontal surfaces, wherein, when the top and bottom trays are rotated about the rotation axis, the bearing surface rides along the ramped surfaces from the lowered horizontal surface to the raise horizontal surface and vice versa. When the bearing surface rides along a one of the ramped surface from the raised surface to the lowered horizontal surface, the top and bottom shells may snap into a selected angular orientation about the rotation axis.

One of the top tray and the bottom tray may comprise a stop groove concentric with the rotation axis and extending partially about the rotation axis. The other of the top tray and bottom tray may comprise a stop arranged to extend into the stop groove. Contact between the stop and the first and second ends of the stop groove limit rotation of the top tray and bottom tray about the rotation axis.

The device may further comprise a removable connection, wherein one or more of the top shell and the bottom shell is removably connected by the removable connection with one of the first or second trays. The removable connection may be an interference fit or a snap-fit connection.

The device may include a fidget device connected with the top shell or the bottom shell. The fidget device may provide a tactile, audible, visual, or other sensation to a human user.

The scent emitter may be formed from one or more of clay, pumice, polymer foam, plastic, wood, or fabric.

The device may include a scent emitter retaining clip arranged to removably hold the scent emitter in a scent emitter cavity. The retainer clip may comprise a clip body positioned along a bottom of the second tray and a plurality of arms extending through respective openings in the second tray adjacent the scent emitter cavity, wherein the arms resiliently hold the scent emitter within the scent emitter cavity. The second tray may further comprise a finger groove configured to receive a fingertip, such that pressing the fingertip in the finger groove against the scent emitter releases the scent emitter from the second tray.

The device may further comprise a lanyard, wherein the bottom shell defines a first lanyard aperture, and wherein the lanyard engages a lanyard clip on the first or second tray.

The first and second trays may be permanently affixed with the respective top and bottom shells.

BRIEF DESCRIPTION OF THE DRAWINGS

The above-described and/or other aspects of the disclosure will be more apparent in view of details and exemplary embodiments of the disclosure with reference to the accompanying Drawings, in which.

DETAILED DESCRIPTION OF EXEMPLARY EMBODIMENTS

Figure 1A:
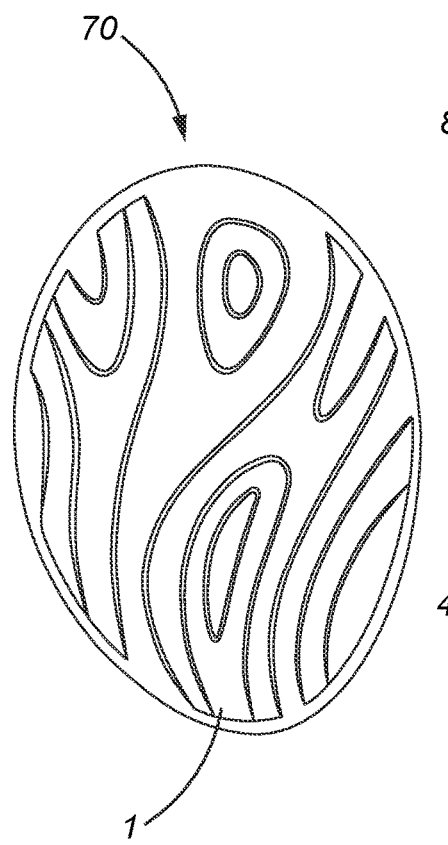
FIGS. 1A and 1B are top views of an example of an embodiment of a scent case in the closed and opened positions, respectively, according to aspects of the present disclosure.

Exemplary embodiments of the disclosure will now be described below by reference to the attached figures. The described exemplary embodiments are intended to assist the understanding of the invention and are not intended to limit the scope of the invention in any way. Like reference numerals refer to like elements throughout.

Figure 1B:
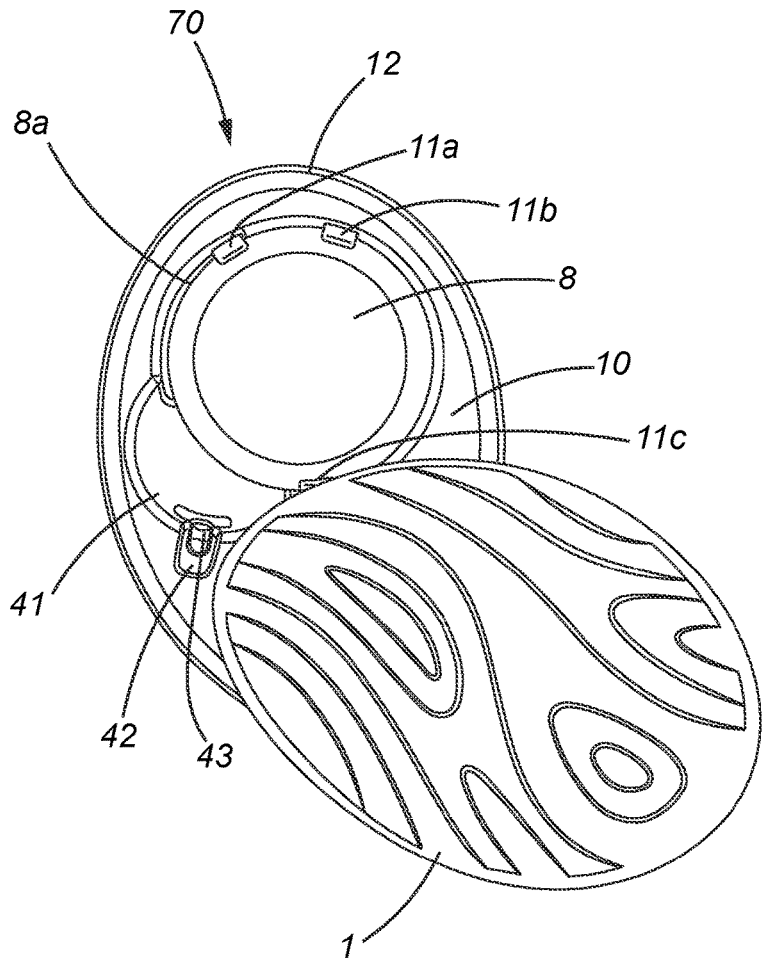

FIG. 1A is a top view of an example of one embodiment of an aromatherapy device or scent case 70, with scent case 70 in a closed position. FIG. 1B is a top view of the scent case 70 in an open position with top shell 1 rotated with respect to the bottom shell 12 from the closed position of scent case 70. The open position illustrated in FIG. 1B, reveals scent emitter 8, provided as a scent stone in the illustrative example. As shown in FIG. 1B, the top shell is rotated about 120° with respect to the bottom shell. The open position of top shell 1 may be greater or less than 120°. According to some embodiments, a plurality of open positions at different angular orientations may be provided The open position of scent case 70 shown in FIG. 1B also illustrates a bottom tray 10 positioned inside bottom shell 12. Bottom tray 10 according to the embodiment illustrated contains scent emitter 8 within a scent emitter cavity 8*a*. As shown in the exploded view in FIG. 2, retaining clip 11 is connected with bottom tray 10 to hold scent emitter 8. Arms 11*a*, 11*b*, 11*c* extend upward through openings in bottom tray 10 to releasably hold the emitter, as will be explained below. The top portions of arms 11*a*, 11*b* and 11*c* of a retaining clip 11 are also visible in FIG. 1B. These top portions may include hooked or curved regions shaped to fit over the top of scent emitter 8 to secure scent emitter 8 to bottom tray 10. Bottom tray 10 also defines a finger groove 41 adjacent scent emitter cavity 8*a*, which allows a user to insert a fingertip under the scent emitter 8 to facilitate removing it from the case 70.

While scent emitter 8 is sometimes referred to as a scent stone, it will be understood that many types of materials may be used to hold a volatile aromatic substance such as an essential oil and allow the substance to evaporate to emit fragrances, aromas, or scents. Scent emitter 8 may be a natural substance, such as pumice or another porous stone or an artificially manufactured item that can absorb or be impregnated with a scent generating substance. According to embodiments of the disclosure, scent emitter 8 may be formed from clay, pumice, polymer foam, sintered polymer particles, plastic, wood, fabric or a combination of the foregoing. Scent emitter 8 may be supplied to a user with or without the aromatic substance already applied and may be formed from a material that absorbs an essential oil or other volatile substance applied to the emitter by the user. A user may wish to replace scent emitter 8 when the scent has diminished or replenish the emitter by applying additional essential oil to the emitter. A user may have several different emitters, each impregnated with a different scent emitting substance. The user can remove scent emitter 8 from aromatherapy device 70 using finger groove 41 and replace it with a different emitter when the user desires a different scent.

Figure 6:
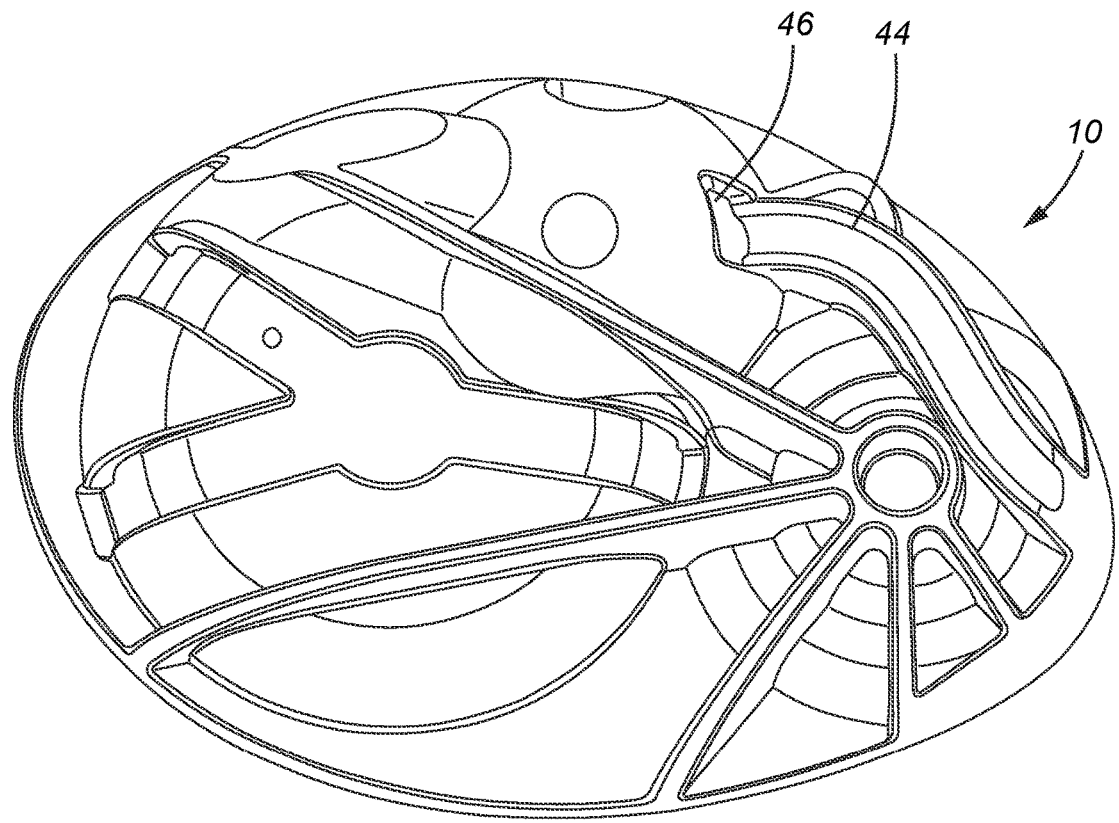
FIG. 6 illustrates a bottom view of the tray shown in FIG. 5.
Figure 7:
FIG. 7 illustrates a lanyard that may be attached to the scent case according to the embodiment of FIG. 1.

Also shown in FIG. 1B are lanyard receiving slot 42 and lanyard retaining clip 43 that secure a lanyard 16, shown in FIG. 7, to scent case 70. Lanyard receiving slot 42 may be positioned adjacent finger groove 41 to secure and release a lanyard, such as lanyard 16 shown in FIG. 7, from lanyard retaining clip 43. While described as a lanyard 16, another type of string, band, chain or other attachment device for holding or attaching case 70 to another object may also be used. For example, the user may wish to attach scent case 70 to a wristband, bracelet, necklace or the like. Such embodiments are within the scope of the present disclosure. As will be explained below with respect to FIGS. 6 and 7, an attachment end 16*a* of lanyard 16 is inserted through opening 45 of bottom shell 12, along a lanyard path 44 and through bottom tray 10 to loop around clip 43.

Figure 2:
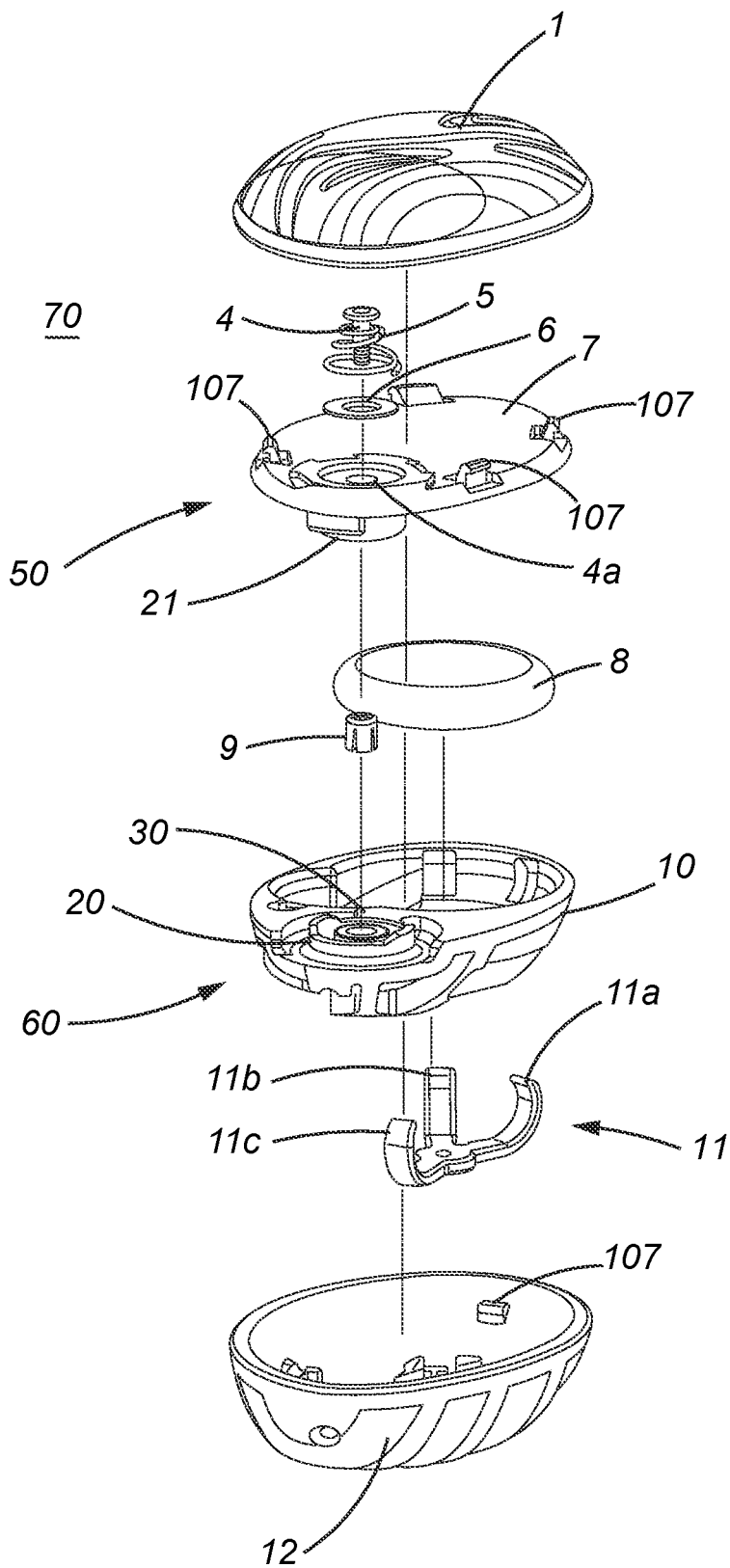
FIG. 2 is an exploded view of the embodiment shown in FIG. 1 and illustrates components of the scent case.

FIG. 2 is an exploded view of the scent case 70. Top tray 7 is affixed to the inside surface of top shell 1. Bottom tray 10 is affixed to the inside surface of bottom shell 12. Top and bottom trays 7, 10 may be connected with their respective top and bottom shells 1, 12 by fasteners, adhesive, welds, snap-fit connections, or by other methods know in the field of the disclosure. According to a preferred embodiment, male tabs or female slots are provided on the inside surfaces of top and bottom shells 1, 12 and corresponding tabs or slots are provided on top and bottom trays 7, 10. As shown in the embodiment of FIG. 2, male tabs 112 are provided on the inside surface of bottom tray 12. These tabs engage with corresponding slots on bottom tray 10 (not visible in FIG. 2). Likewise, top tray 7 includes male tabs 107 that engage with corresponding slots on the inside surface of top shell 1 (not visible in FIG. 2). As will be described below, top and bottom trays 7, 10 mechanically connect portions of case 70 with one another and hold scent emitter 8. By providing top and bottom shells 1, 12 as separate components from the trays 1, 12, a wide variety of differently shaped, decorated, textured, and/or colored embodiments of case 70 can be manufactured efficiently. A wide variety of shells can be connected to the same mechanism provided on top and bottom trays 7, 10.

Figure 3:
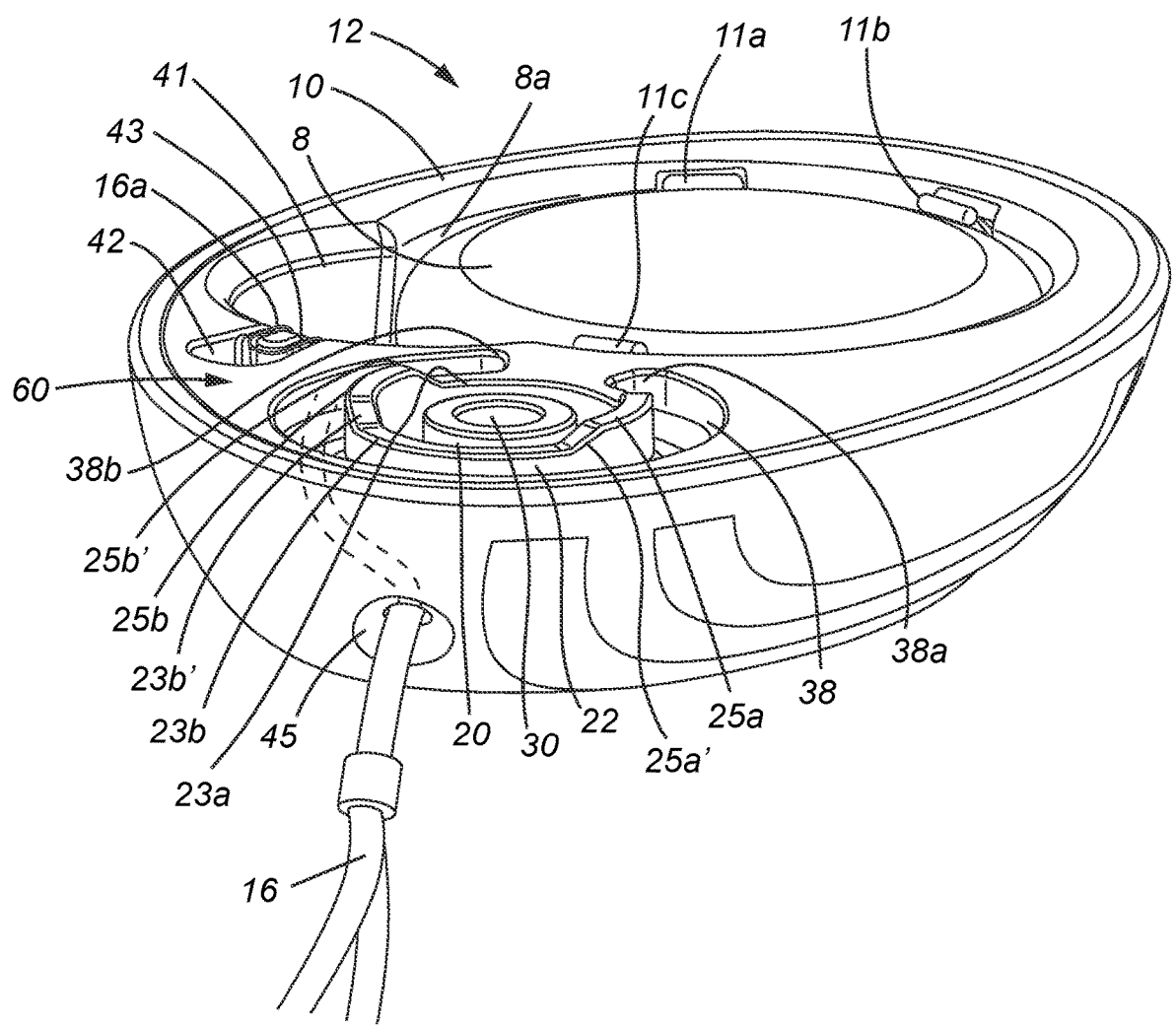
FIG. 3 is a perspective view of a bottom shell containing a bottom tray and a scent emitting stone held in the bottom tray, according to the embodiment of FIG. 1.

According to one embodiment, top tray 7 is provided with a male connection assembly 50 formed by a cylindrical curved protrusion 21 (shown in detail in FIG. 4) that is received by a female connection assembly 60 on bottom tray 10. As shown in FIGS. 3 and 5, female connection assembly 60 includes curved receiving groove 20. Curved receiving groove 20 and curved protrusion 21 of male connection assembly 50 on top tray 7 cooperate to form a rotatable hinge, with curved protrusion 21 rotating about a first axis inside curved receiving groove 20 to allow rotation of the top tray 7 and top shell 1 relative to bottom tray 10 and bottom shell 12, moving from the closed configuration in FIG. 1A to the open configuration in FIG. 1B and vice versa. While shown as cylinders, one or both of curved protrusion 21 and curved receiving groove 20 may be formed from one or more segments of cylinders. According to other embodiments, male connection assembly 50 may be provided on the bottom tray 12 with female connection assembly 60 provided on the top tray 7.

Also shown, for example, in FIGS. 2 and 3, scent emitter 8 is positioned between top tray 7 and bottom tray 10. According to one embodiment, scent emitter 8 is positioned in a cavity 8a formed by bottom tray 10. Scent emitter 8 is held in place on bottom tray 10 by retention clip 11. A portion of retention clip 11 is positioned underneath bottom tray 10. Arms 11a-11c of retention clip 11 extend upward through openings in bottom tray 10 to engage with scent emitter 8. Retention clip 11 may be formed from a resilient material that provides a sufficient modulus of elasticity to securely hold scent emitter 8 in place. The modulus of retention clip 11 is selected so that it can flex so that a user can remove and replace the emitter 8 by pressing a fingertip into finger groove 41 and pulling upward on the emitter. Retention clip 11 is preferably formed from a material that is non-reactive with essential oils and solvents used to deliver aromatherapy vapors. According to a preferred embodiment, retention clip 11 is formed from a polymer, such as polypropylene. While the embodiment shown in FIG. 2 has three arms, it will be understood that retention clip 11 may have more than three arms or fewer than three arms.

FIG. 2 also illustrates threaded member 4, which may be a screw. Screw 4 extends through top securing aperture 4a of top tray 7 and downward through bottom securing aperture 30 of bottom tray 10. In the embodiment of FIG. 2, screw 4 includes a head sized to be larger than top securing aperture 4a. A lower end of screw 4 is received in threaded insert 9, which may be a metal nut. Threaded insert 9 is fixed to bottom tray 10 within bottom securing aperture 30 by adhesive, welding, or other methods known in the field of the disclosure. Alternatively, insert 9 may be formed integrally with bottom tray 10, for example, by insert molding a metal nut within aperture 30. According to another embodiment, instead of providing a separate metal nut, threads shaped to engage with screw 4 may be molded directly on the inside surface of aperture 30.

The engagement of threaded member or screw 4 and insert 9 positions the top and bottom trays with respect to one another and allows a small amount of vertical travel of top tray 10 away from bottom tray 12, as will be explained below, while allowing the top and bottom trays to rotate with respect to one another. A washer 6 may also be provided around and below the head of screw 4.

Urging member 5 is provided below the head of threaded member 4 and above the top surface of top tray 7. According to one embodiment, urging member 5 is a conical spring surrounding threaded member 4. Washer 6 may be provided between the conical spring 5 and the upper surface of top tray 7. Spring 5 provides a resilient force upward on threaded member 4 that pulls bottom tray 10 towards top tray 7 and keeps curved receiving groove 20 and curved protrusion 21 engaged with one another.

FIG. 3 is a detailed perspective view of bottom shell 12 and its contents. FIG. 5 shows a top view of bottom shell 12 and its contents. According to one embodiment, bottom tray 10 is positioned inside bottom shell 12 with curved receiving groove 20 facing upward. Receiving groove 20 provides a circular recess that will receive curved protrusion 21 of male connection assembly 50. In a center of the circle formed by curved receiving groove 20, is securing aperture 30, which receives threaded insert 9.

Positioned around curved receiving groove 20 is wall 22, which comprises a plurality of raised and lowered horizontal surfaces separated by respective ramped surfaces. In the embodiment shown in FIGS. 3 and 5, two such lowered surfaces and two such raised surfaces are provided. First lowered horizontal surface 23a is provided along an arc of wall 22 adjacent to scent emitter 8. Moving clockwise around wall 22, the first lowered surface is connected with first ramped surface 23a', which is in turn connected with first raised horizontal surface 25a, which is in turn connected with second ramped surface 25a', which is in turn connected with second lowered horizontal surface 23b, which is in turn connected with third ramped surface 23b', which is in turn connected with second raised horizontal surface 25b, which is in turn connected with fourth ramped surface 25b' completing the circumference of wall 22.

Figure 4:
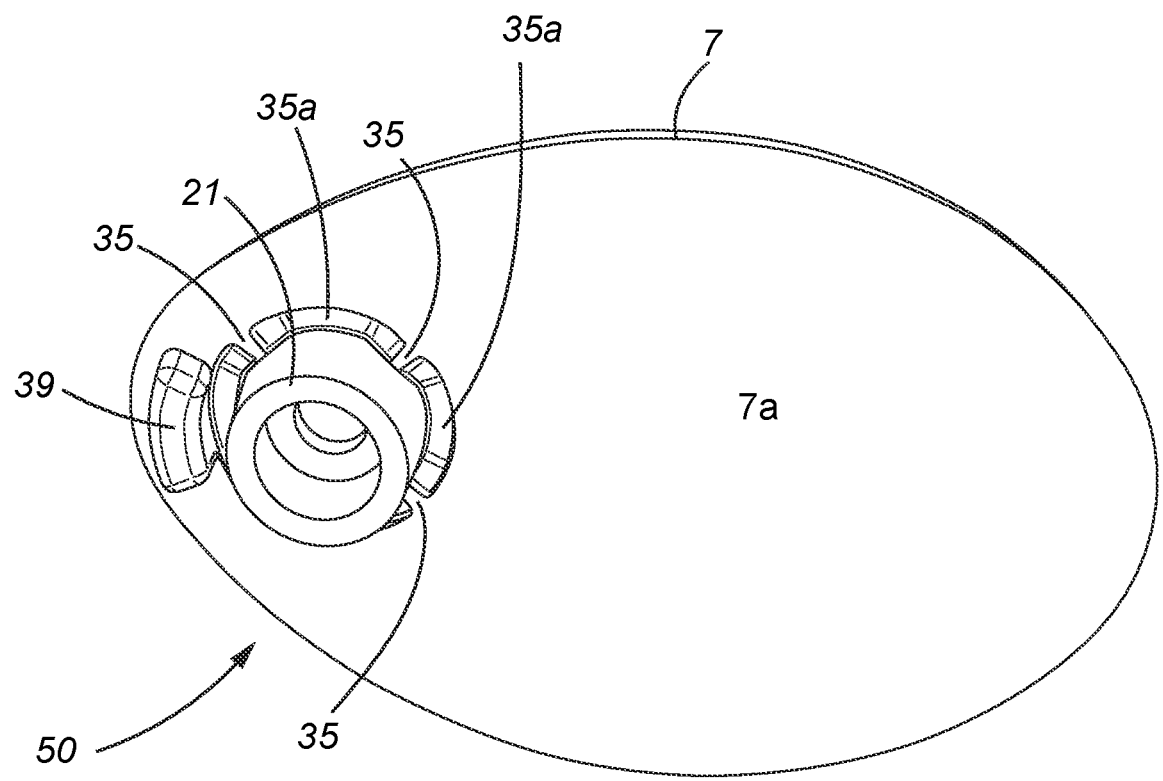
FIG. 4 is a perspective view of a male tray with a curved protrusion, according to the embodiment of FIG. 1.
Figure 5:
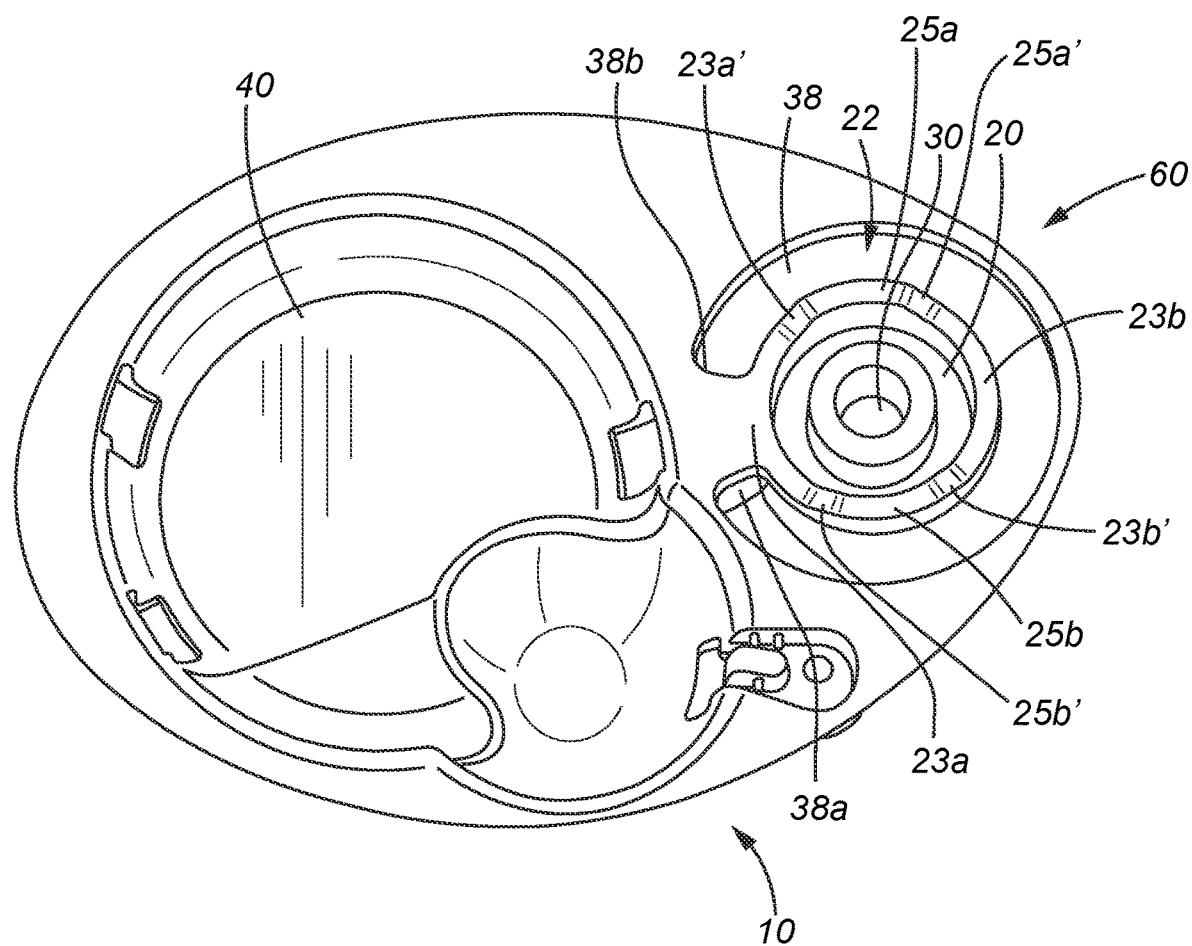
FIG. 5 illustrates a female tray with a curved receiving groove, according to the embodiment of FIG. 1.

FIG. 4 illustrates the downward facing surface of top tray 7 showing details of male connection assembly 50. Curved protrusion 21 projects down from top tray 7. Bearing surfaces 35 are provided about the circumference of protrusion 21. In this embodiment four bearing surfaces 35 are provided about protrusion 21. Bearing surfaces 35 are coplanar with the lower surface 7a of top tray 7. Four relieved regions 35a are provided around the circumference of protrusion 21 between bearing surface 35 at selected angular positions. Relieved regions 35a extend into bottom surface 7a of top tray 7 a distance sufficient to accept insertion of raised horizontal surfaces 25a, 25b. According to one embodiment, a first pair of the relieved regions 35a are aligned with the major axis of top tray 7 (that is, to the left and right of protrusion 21 in the view of FIG. 4) and a second pair of relieved regions 35a are aligned perpendicular to the major axis of top tray 7 (that is, above and below protrusion 21 in the view of FIG. 4).

When case 70 is in the close position, as shown in FIG. 1A, raised horizontal surfaces 25a and 25b extend into the first pair of the relieved regions 35a. The resilient force provided by spring 5 pulls the lowered horizontal surfaces and bearing surfaces together. Contact between ramped surfaces 23a', 25a', 23b', 25b' and the sides of bearing surfaces 35 hold case 70 in the closed configuration. Rotation of top tray 7 relative to bottom tray 10 causes one or more of the bearing surfaces 35 to slide along upward ramped surfaces 23a', 23b', pulling trays 7 and 10 away from one another, pulling the raised horizontal surfaces 25a, 25b out from the first pair of relieved regions 35, and compressing spring 5. According to one embodiment, when top tray 7 is rotated about 90 degrees clockwise relative to bottom tray 10, bearing surfaces 35 encounter downward ramps 25a' and 25b'. The resilient force provided by spring 5 drives bearing surfaces 35 down the ramps 25a', 25b' so that raised horizontal surfaces 25a and 25b extend into the second pair of the relieved regions 35a in top tray 7. Engagement of the raised surfaces 25a, 25b with the second pair of relieved regions 35 holds case 70 open with top tray 7 and top shell 1 partially open with respect to bottom tray 10 and bottom shell 12, for example, with top tray at about a 90° angle with respect to bottom tray. In this configuration, scent emitter 8 is mostly uncovered, allowing absorbed aromatic substances to evaporate from the emitter. At the same time, top tray 7 is partially positioned above scent emitter 8, blocking the emitter from exiting cavity 8a and assuring that the scent emitter 8 remains securely held in the cavity of bottom tray 10.

Further rotation of top tray 7 relative to bottom tray 10 causes bearing surfaces 35 to again encounter upward ramps 23a', 23b', pulling raised horizontal surfaces 25a, 25b out from the second pair of relieved regions 35a, and compressing spring 5. Thus, top tray 7 is able to rotate past the point where it is at a 90° angle with respect to the bottom tray 10. In this more fully open configuration, for example, at about 120° as shown in FIG. 1B top tray 7 is clear of scent emitter 8, allowing the user to remove the scent emitter, and replace it.

According to one embodiment, the resilient force of spring 5 pulling the top and bottom trays together into the closed and open configurations will top tray 7 the case to "snap" into place as raised horizontal surfaces 25a, 25b extend into the first or second pair of relieved regions 35a on top tray 7. According to one embodiment, this "snap" arrangement generates an audible and/or tactile sensation sensible by the user.

As shown in FIG. 5, bottom tray 10 includes stop slot 38. As shown in FIG. 4, top tray 7 includes stop 39. When top and bottom trays are engaged, stop 39 is positioned within stop slot 38. When top tray 7 is rotated stop 39 moves along stop slot 38. According to one embodiment, raised horizontal surfaces 25a, 25b engage with the second pair of relieved regions 35a (that is, they hold the top tray at about 90° with respect to bottom tray) before stop 39 contacts first end 38a of slot 38. The user can rotate top tray 7 past the engagement at 90°, for example, to allow the user to remove or replace scent stone 8. If the user continues to rotate the top tray, stop 39 will abut slot end 38a, preventing further rotation of top tray 7 relative to bottom tray 10. According to a further embodiment, no stop 39 or stop slot 38 are provided. In this embodiment, top shell 1 and top tray 7 are able to rotate through a full circle relative to bottom shell 12 and bottom tray 10.

In the embodiments discussed above, two raised horizontal surfaces 25a, 25b and two pairs of relieved regions 35a are disclosed. The disclosure is not limited to this arrangement and a greater or fewer number of raised horizontal surfaces and relieved regions can be provided within the scope of the disclosure. For example, a single raised horizontal region could be provided on wall 20 that engages with a plurality of relieved regions around protrusion 21.

A lanyard, such as lanyard 16 shown in FIG. 7 may be attached with case 70. As shown in FIG. 3, lanyard opening 45 is provided through bottom shell 12. Attachment end 16a of lanyard 16 is inserted through opening 45. FIG. 6 is a bottom view of bottom tray 10 showing lanyard path 44. When bottom shell 12 is connected with bottom tray 10, lanyard path 44 forms a closed tube, with the inside surface of shell 12 covering one side of lanyard path 44. Attachment end 16a is advanced along lanyard path 44 until it passes through opening 46. As shown in FIG. 3, attachment end 16a loops around lanyard clip 43, securing case 70 with lanyard 16.

Figure 8:
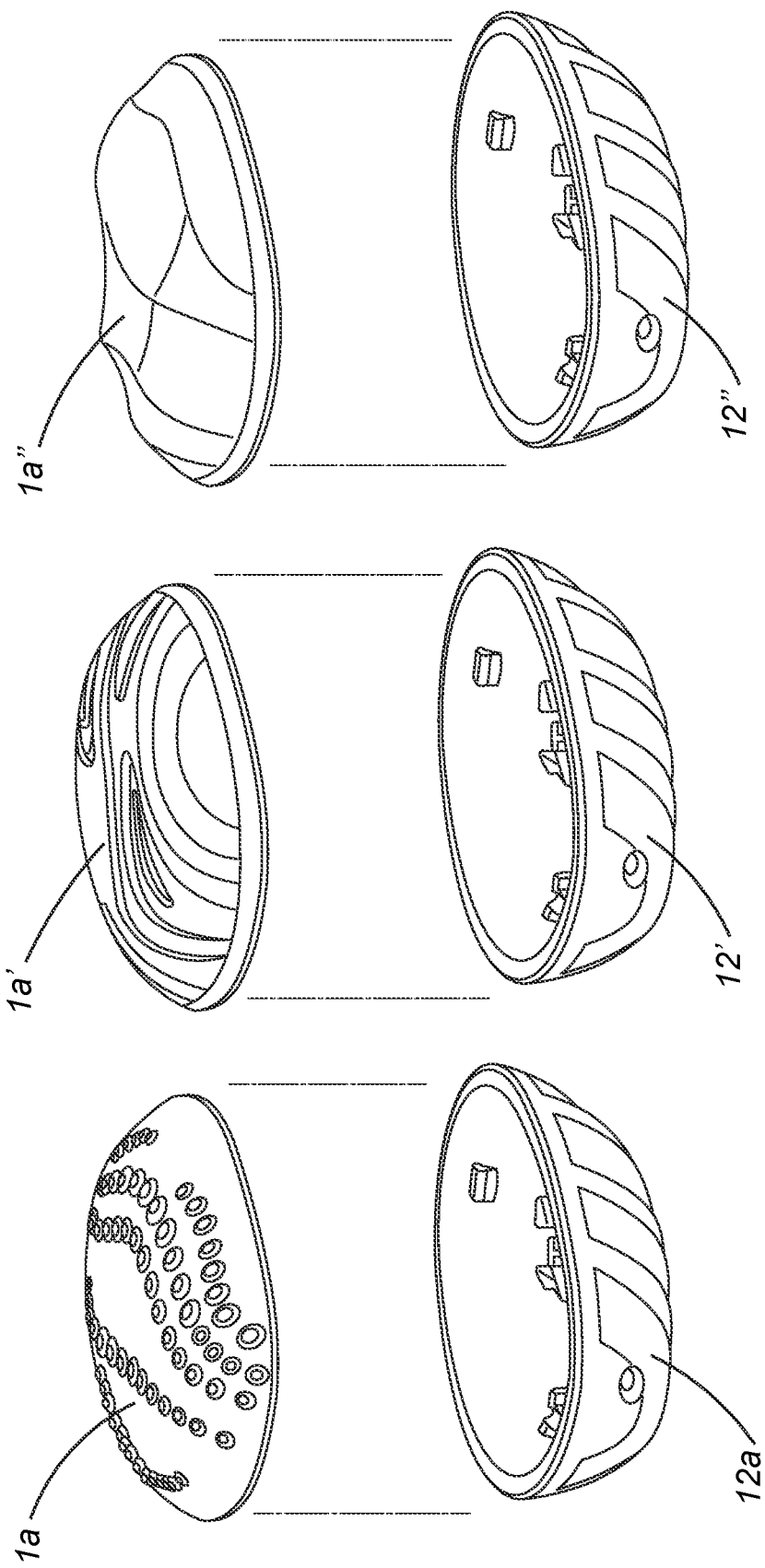
FIG. 8 shows perspective views of alternative top and bottom shells forming a scent case according to further embodiments of the disclosure.

As discussed above, top and bottom trays 7, 10 and their respective mechanical components can be manufactured separately from top and bottom shells 1, 12. This allows a manufacturer to provide a variety of scent cases 70 with different surface textures, shapes, and colors. Exemplary top shells 1a, 1a' and 1a'' and exemplary bottom shells 12a, 12a', 12a'' are shown in FIG. 8. According to a one embodiment, case 70 is manufactured with shells 1, 12 permanently affixed with trays 7, 10, for example, by ultrasonically welding or adhesive bonding the shells to the trays. According to another embodiment, one or more of the top and bottom shell 1, 12 is removable from its respective tray, allowing consumers to modify and customize the case.

Figure 9:
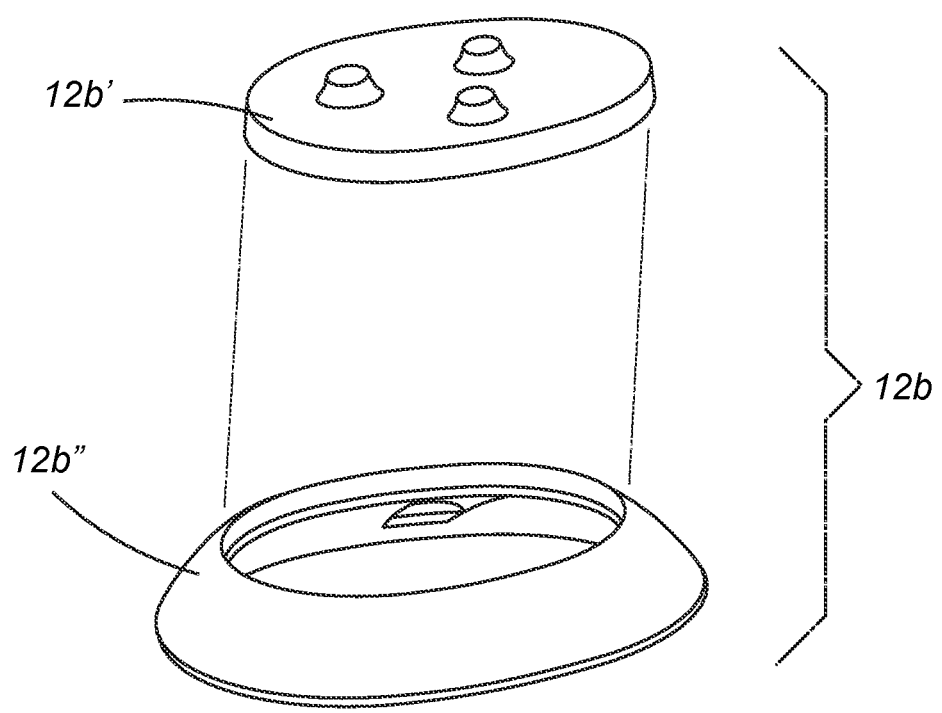
FIG. 9 is an exploded view of a scent case including an insertable fidget device according to a still further embodiment of the disclosure.

FIG. 9 is an exploded view showing a top shell 12b according to a further embodiment of the disclosure. Shell 12b is formed from a top shell housing 12b' and a fidget mechanism 12b''. Fidget mechanism 12b'' fits into an opening in housing 12b'. Mechanism 12b'' and housing 12b' may be joined by fasteners, adhesives, welding, interference fit, snap fit connection or other joining methods know in the field of the disclosure. According to one embodiment, fidget mechanism 12b'' is permanently fixed with housing 12b' by the manufacturer when case 70 is constructed. According to a further embodiment, fidget mechanism 12b'' is removable and replaceable by the end user. Fidget mechanism 12b'' may include a variety of devices that provide the end user with pleasing tactile and/or audible stimulation.

Figure 10A:
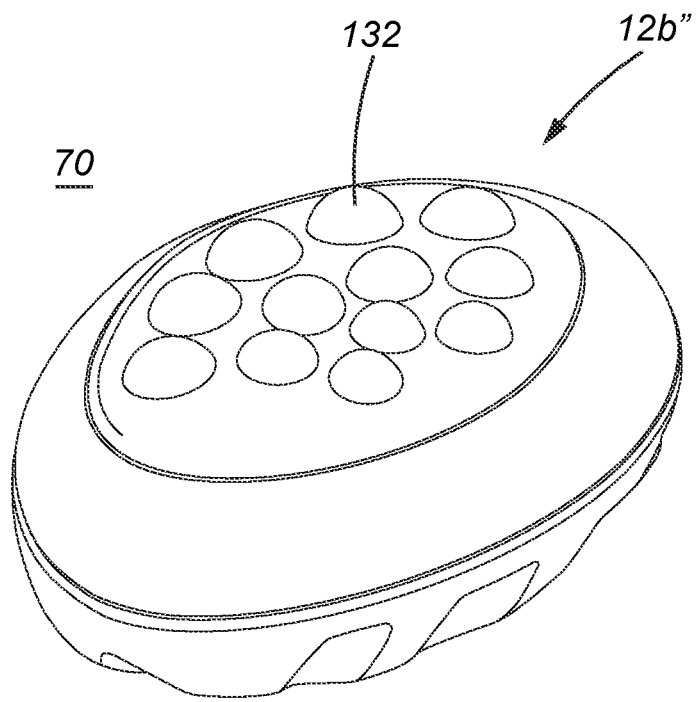
FIGS. 10A and 10B are a perspective view and an exploded view, respectively, of a fidget device according to another embodiment of the disclosure.
Figure 10B:
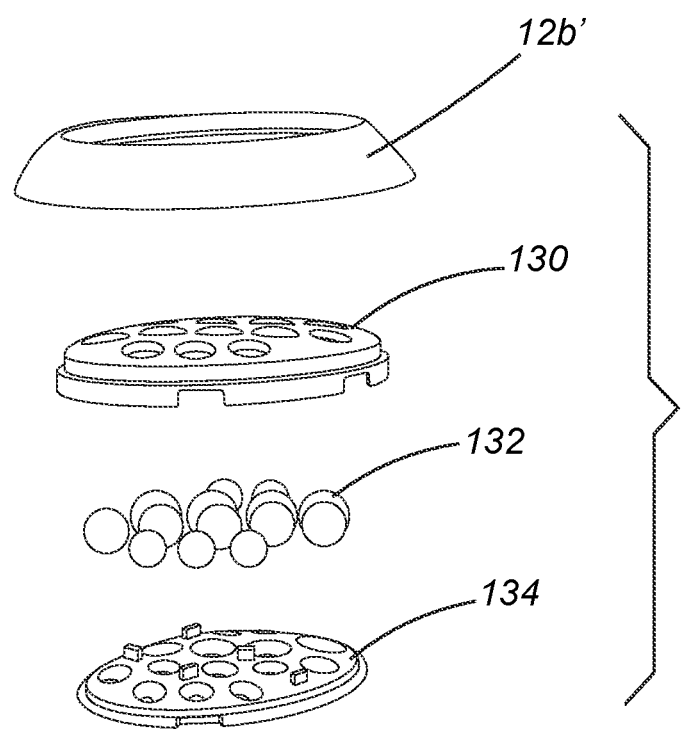

FIGS. 10A and 10B show a fidget mechanism 12b'' according to one embodiment of the disclosure. One or more metal balls 132 protrude from the top surface of case 70 and can be rotated by the user to create a pleasing tactile sensation. As shown in the exploded diagram of FIG. 10B, cover 130 is provided with openings sized to allow balls 132 to protrude. These openings are sized to be smaller than the diameters of balls 132 so that the balls remain captive below cover 130. Support 134 is positioned below cover 130. Support 134 has cavities sized to hole balls 132 against cover 130 and to allow the balls to rotate, for example, when manipulated by a user. Cover 130, balls 132, and support 134 are positioned within top shell housing 12b' to form top shell 1 of case 70.

Figure 11A:
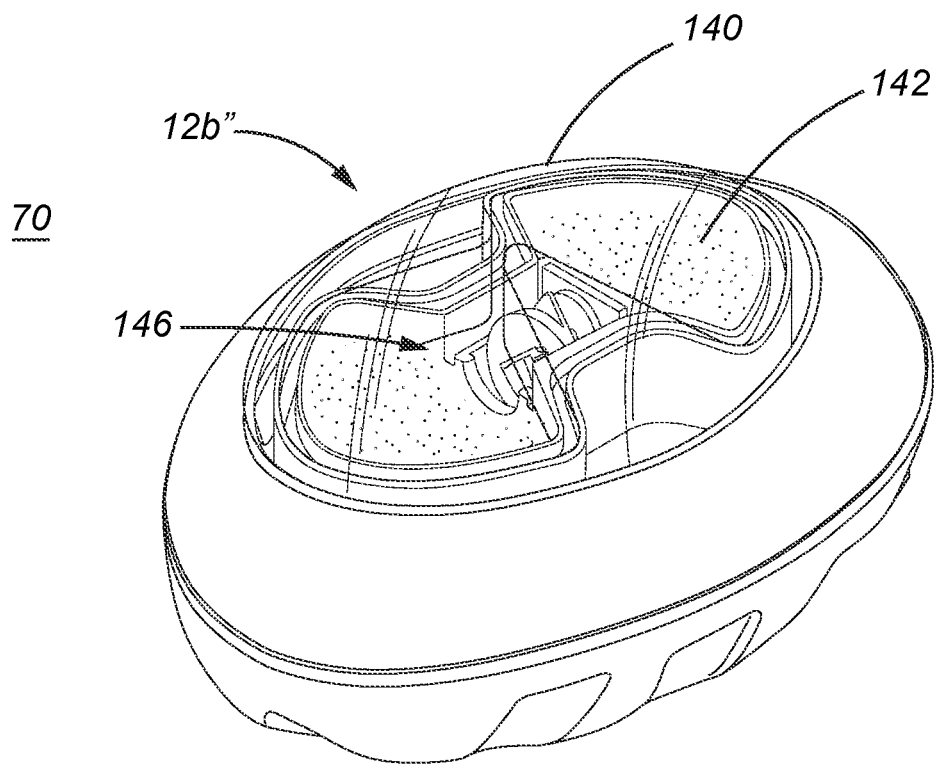
FIGS. 11A, 11B, and 11C are a perspective view and two exploded views of a fidget device according to other embodiments of the disclosure.
Figure 11B:
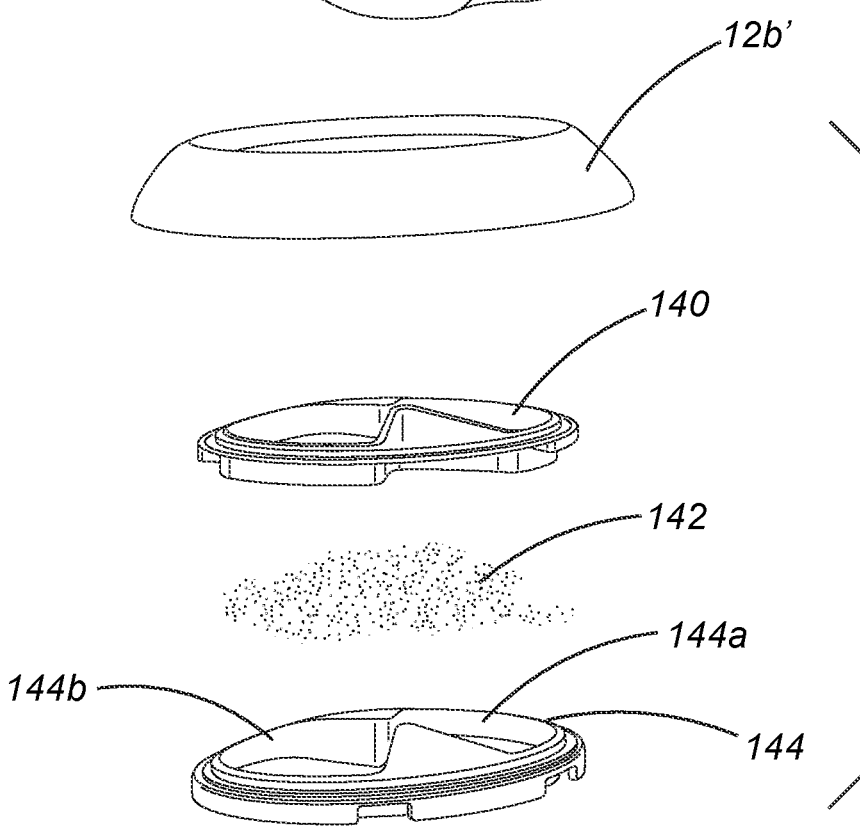
Figure 11C:
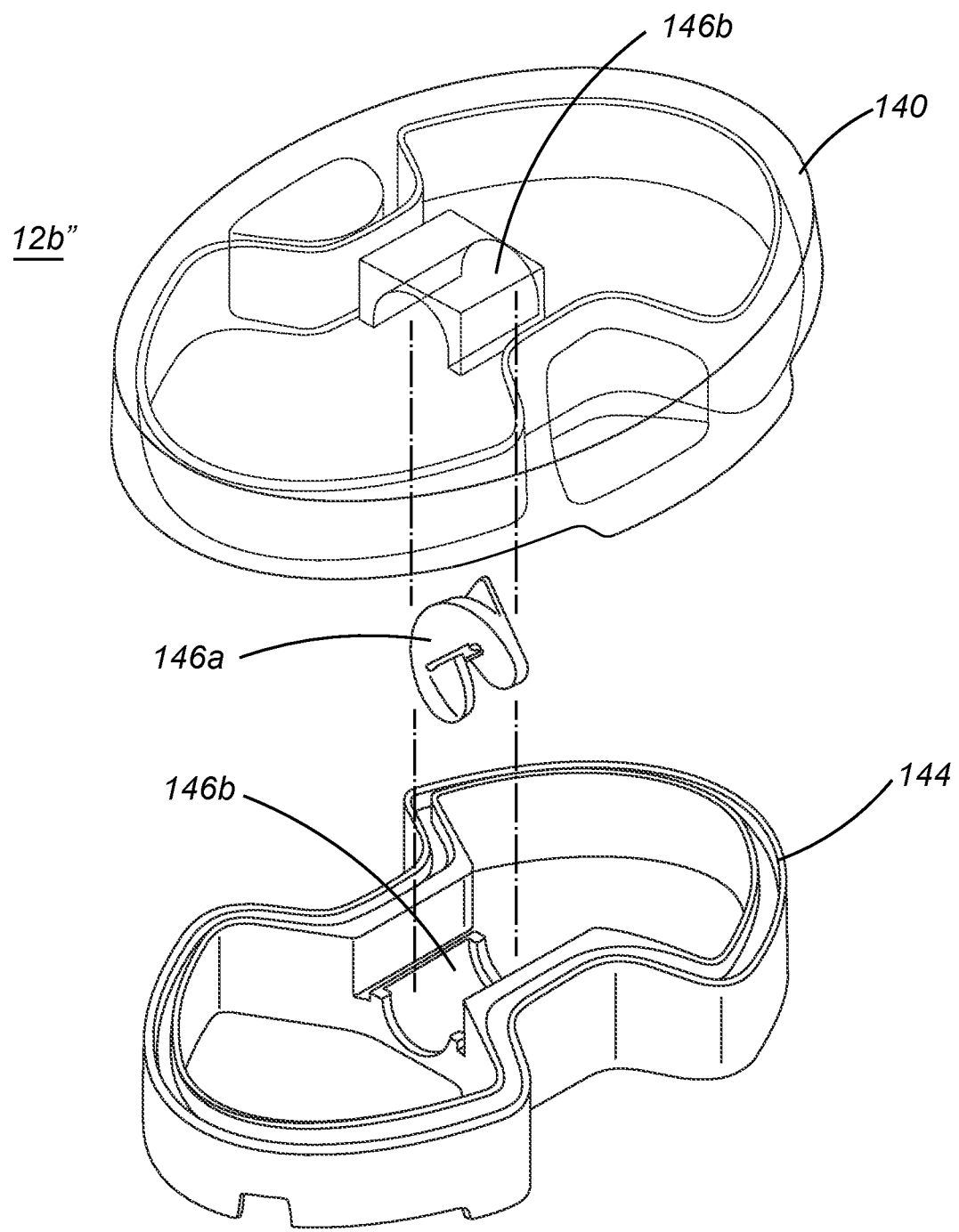

FIGS. 11A and 11B show a fidget mechanism according to another embodiment of the disclosure that creates an "hour glass" mechanism with sand or another flowable material visible through a clear dome 140 flowing between two chambers through an orifice 146. As shown in the exploded view of FIG. 11B, support 144 defines two cavities 144a, 144b. A quantity of sand 142 partially fills the cavities 144a, 144b. Clear dome 140 is fitted over support 144 and is shaped so that the cavities 144a, 144b are closed to form a container preventing the sand from escaping. An orifice 146 is provided between cavities 144a, 144b. When a user tilts case 70, sand 142 flows from one cavity 144a, 144b to the other through orifice 146, creating a pleasing visual sensation. According to a further embodiment, a flow director 146*a* is positioned within orifice 146. Flow director 146*a* is shaped to direct the flow of sand 142 in a selected pattern. For example, flow director 146*a* may have a spiral shape to direct sand in a spiral pattern as it flows between chambers 144*a*, 144*b*. According to a further embodiment, flow director 146*a* is held between bearing surfaces 146*b* in the dome 140 and support 144. Sand flowing through spiral flow director 146*a* causes it to rotate.

Figure 12A:
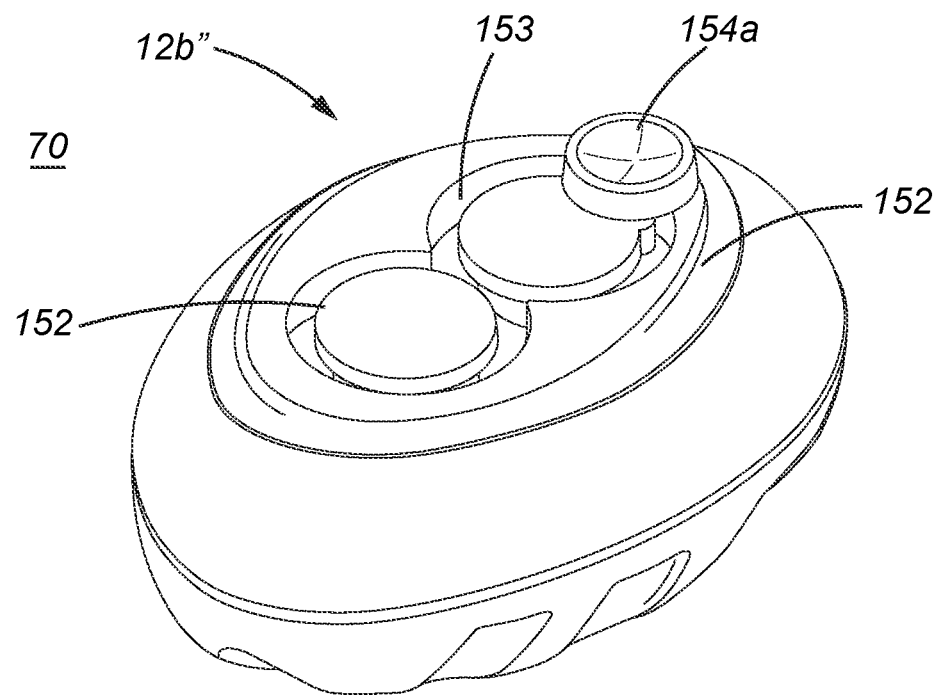
FIGS. 12A and 12B are a perspective view and an exploded view, respectively, of a fidget device according to another embodiment of the disclosure.
Figure 12B:
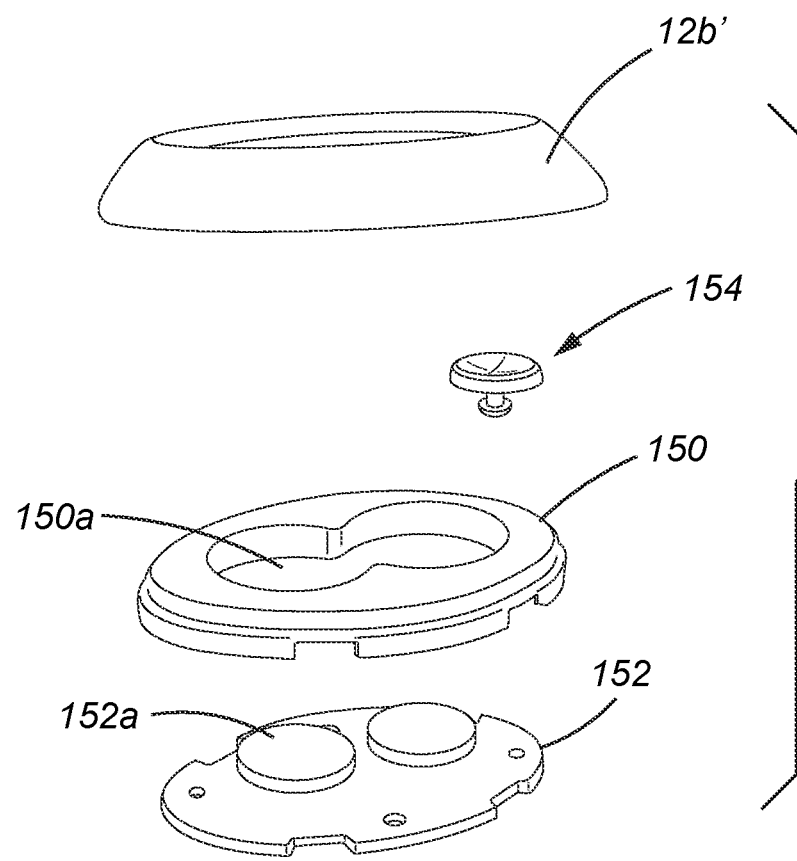

FIGS. 12A and 12B show another embodiment of a fidget mechanism according to an embodiment of the disclosure. A slider 154 is provided on the top of case 70 that can be manipulated by a user to move along a track 153, such as a "FIG. 8" track. In this embodiment, cover 150 is provided with an opening 150*a* that defines a continuous perimeter. Support 152 includes one or more extensions 152*a* shaped to fit within opening 150*a* to define track 153. Cover 150 and extensions 152*a* are shaped to define slots below the surface of cover 150 on either side of track 153. Slider 154 includes a shoulder shaped to fit within the slots. A shaft extends upward from the shoulder and connected with a button 154*a* positioned above cover 150 and extensions 152*a*. The shaft is sized to fit within track 153 and allow the slider to slide along the track. The user can engage button 154*a* to slide the slider 154 about track 153.

Figure 13A:
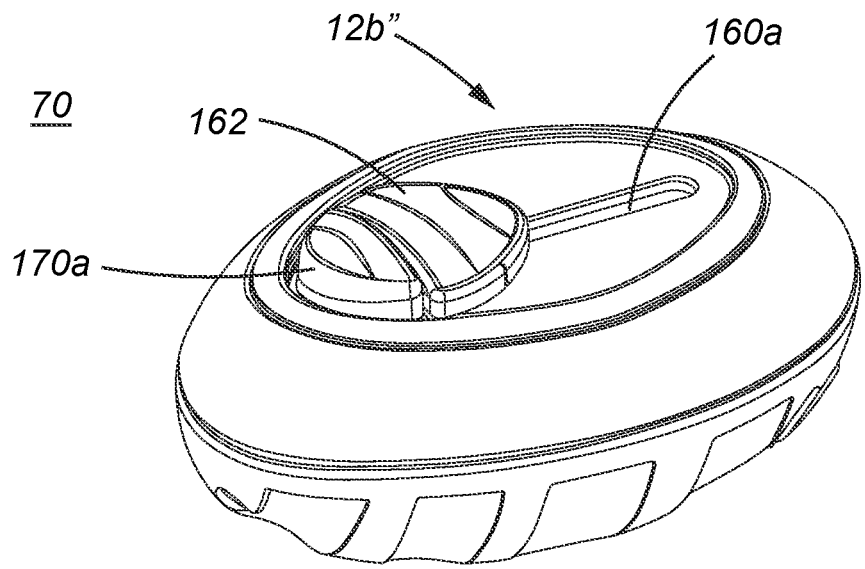
FIGS. 13A and 13B are a perspective view and an exploded view, respectively, of a fidget device according to another embodiment of the disclosure.
Figure 13B:
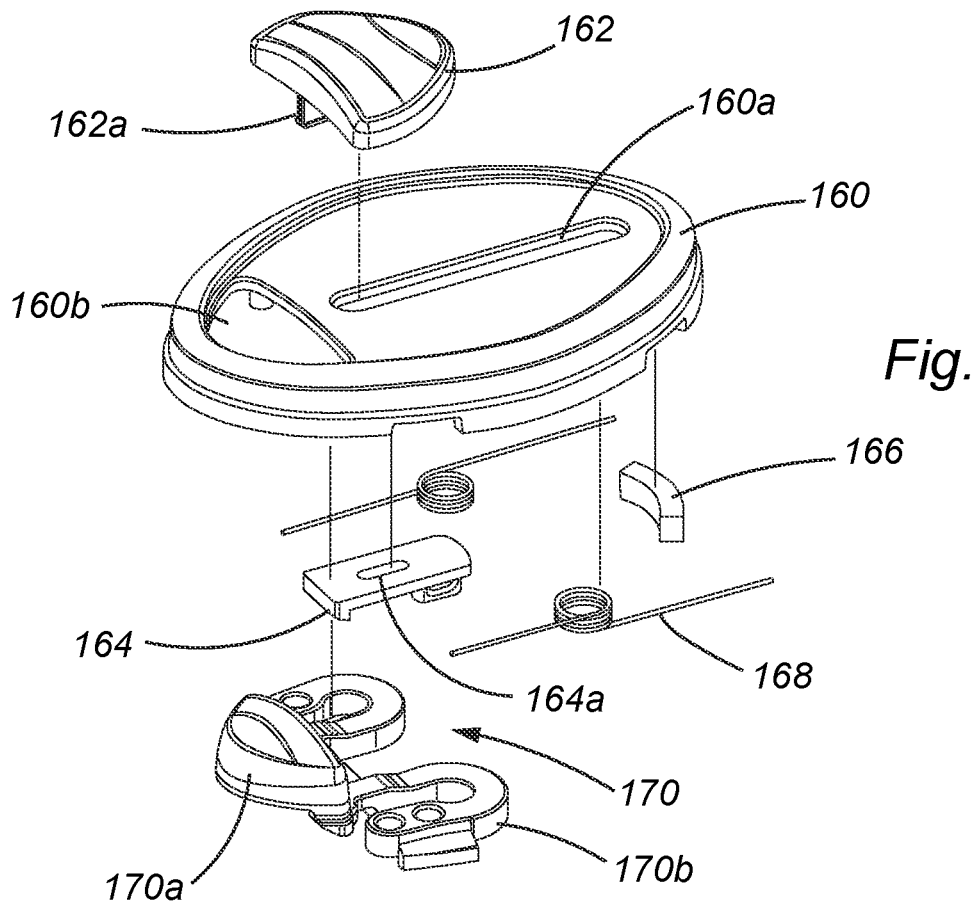

FIGS. 13A and 13B show another embodiment of a fidget mechanism according to an embodiment of the disclosure. Cover 160 includes a linear slot 160*a* and opening 160*b*. Slider 162 includes a ridge 162*a* extending downward. Ridge 162*a* is shaped to fit through slot 160*a* and to guide slider 162 to slide along the slot. Keeper 164 is positioned below cover 160 and includes opening 164*a* sized to accept insertion of ridge 162*a* to hold slider 162 captive within slot 160*a*. Ridge 162*a* is permanently fixed with opening 164*a* by welding, an adhesive, or other methods known in the field of the invention. One or more springs 168 are connected between keeper 164 and anchors (not shown). Springs 168 bias slider 162 toward one end of slot 160*a*. According to one embodiment, springs 168 are arranged to bias slider 162 along slot 160*a* away from opening 160*b* (that is, to the right in the view of FIG. 13A. A latch mechanism 170 is engaged with cover 160. Latch mechanism 170 includes pushbutton 170*a* shaped to extend through opening 160*b*. Pushbutton 170*a* is supported by one or more resilient supports 170*b*. Resilient supports 170*b* allow the latch mechanism 170 to move downward when the user presses pushbutton 170*a*. Latch mechanism 170 and keeper 164 include mutually engaging features so that, when slider 162, and hence keeper 164 are at the end of slot 160*a* nearest opening 160*b* (that is, to the left as shown in FIG. 13A), engagement between latch mechanism 170 and keeper 164 holds slider 162 at that end of the slot. Resilient force applied by spring 168 biases slider 162 toward the opposite end of slot 160*a*. When the user presses pushbutton 162, latch mechanism 170 disengages from keeper 164, allowing slider to move along slot 160*a* under the force of spring 168. Motion of slider 162 and contact of slider 162 with the end of slot 160*a* provided the user with a pleasing audible and tactile sensation. The user can then slide the slider 162 back long slot 160*a* until keeper 164 engages with latch 170. According to one embodiment, a foam pad 166 may be provided on cover 160 near the end of slot 160*a* to cushion the impact of slider 162 with the end of slot 160*a*.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims. Also, features shown or described for one embodiment, component or example may be used in other embodiments, components or examples. Accordingly, combinations of features not specifically illustrated or discussed are also contemplated and are within the spirit and scope of the invention. Therefore, the description should not be construed as limiting the scope of the invention.

What is claimed is:

1. An aromatherapy device comprising:
   a bottom shell;
   a top shell;
   a first tray comprising a curved protrusion arranged about a rotation axis, wherein the first tray is connected with a one of the bottom shell and the top shell;
   a second tray comprising a scent emitter cavity and a curved receiving groove arranged about the rotation axis and positioned and configured to receive the curved protrusion and to guide rotation of the curved protrusion about the rotation axis, wherein the second tray is connected with another of the bottom shell and the top shell;
   a fastener arranged along the rotation axis, wherein the fastener holds the first and second trays in vertical alignment along the rotational axis;
   a spring connected with the fastener and arranged to urge the first and second trays toward one another along the rotation axis; and
   a scent emitter positioned in the scent emitter cavity and configured to release a scent.

2. The aromatherapy device of claim 1, wherein one of the first tray and the second tray comprise a stop groove concentric with the rotation axis and extending partially about the rotation axis, wherein another of the first tray and second tray comprise a stop arranged to extend into the stop groove, wherein contact between the stop and first and second ends of the stop groove limit rotation of the first tray and second tray about the rotation axis.

3. The aromatherapy device of claim 1, further comprising a removable connection, wherein one or more of the top shell and the bottom shell is removably connected by the removable connection with one or more of the first or second trays.

4. The aromatherapy device of claim 3, wherein the removable connection is an interference fit or a snap-fit connection.

5. The aromatherapy device of claim 1, further comprising a fidget device connected with the top shell or the bottom shell.

6. The aromatherapy device of claim 5, wherein the fidget device is adapted to provide a tactile or audible sensation to a human user.

7. The aromatherapy device of claim 1, wherein the scent emitter is formed from one or more of clay, pumice, polymer foam, plastic, wood, and fabric.

8. The aromatherapy device of claim 1, further comprising a scent emitter retaining clip arranged to removable hold the scent emitter in the scent emitter cavity.

9. The aromatherapy device of claim 8, wherein the retainer clip comprise a clip body positioned along a bottom of the second tray and a plurality of arms extending through respective openings in the second tray adjacent the scent emitter cavity, wherein the arms resiliently hold the scent emitter within the scent emitter cavity.

10. The aromatherapy device of claim 9, wherein the second tray further comprises a finger groove configured to receive a part of a finger, such that pressing the finger in the finger groove against the scent emitter releases the scent emitter from the second tray.

11. The aromatherapy device of claim 1, further comprising a lanyard, wherein the bottom shell defines a first lanyard aperture, and wherein the lanyard engages a lanyard clip on the first or second tray.

12. The aromatherapy device of claim 1, wherein the first and second trays are permanently affixed with the respective top and bottom shells.

13. An aromatherapy device comprising:
a bottom shell;
a top shell;
a first tray comprising a curved protrusion arranged about a rotation axis, wherein the first tray is connected with a one of the bottom shell and the top shell;
a second tray comprising a scent emitter cavity and a curved receiving groove arranged about the rotation axis and positioned and configured to receive the curved protrusion and to guide rotation of the curved protrusion about the rotation axis, wherein the second tray is connected with another of the bottom shell and the top shell;
a fastener arranged along the rotation axis, wherein the fastener holds the first and second trays in vertical alignment along the rotational axis;
a biasing member connected with the fastener and arranged to urge the first and second trays toward one another along the rotation axis; and
a scent emitter positioned in the scent emitter cavity and configured to release a scent,
wherein one of the first tray and the second tray further comprises a wall concentric with the rotation axis, wherein the wall comprises at least one raised horizontal surface, wherein another of the first and second trays comprised at least one relieved region and at least two bearing surfaces concentric with the rotation axis, wherein the at least one relieved region is shaped to accept insertion of the at least one raised horizontal surface to releasably hold the first and second trays in a first configuration, wherein a relative rotation of the first and second trays about the rotation axis causes the bearing surfaces to move the at least one raised horizontal surface out from the at least one relieved region to allow the first and second trays to move into a second configuration.

14. The aromatherapy device of claim 13, wherein the at least one raise horizontal surface comprises two raised horizontal surfaces, wherein the at least one relieved region comprises four relieved regions, wherein, in the first configuration the raised horizontal surfaces are engaged with a first pair of the four relieved regions and, in the second configuration, the two raised horizontal surfaces are engaged with a second pair of the four relieved regions.

15. The aromatherapy device of claim 14, wherein in the first configuration the top shell and bottom shell are aligned to close the scent emitter cavity and in the second configuration the top and bottom shells are offset from one another to at least partially open the scent emitter cavity.

16. The aromatherapy device of claim 13, wherein the wall comprises a plurality of ramped surfaces at edges of the at least one raised horizontal surface, wherein, when the first and second trays are rotated about the rotation axis, the bearing surfaces ride along the ramped surfaces to move the raised horizontal surface into and out from the at least one relieved region.

17. The aromatherapy device of claim 13, wherein, when the at least one raised horizontal surface is aligned with the at least one relieved region the top and bottom shells are held at a selected angular orientation about the rotation axis.

\* \* \* \* \*